US010932186B2

(12) United States Patent
Ramiah et al.

(10) Patent No.: US 10,932,186 B2
(45) Date of Patent: Feb. 23, 2021

(54) MULTIPLE NETWORK MODE SELECTION DEVICES

(71) Applicant: CalAmp Corp., Irvine, CA (US)

(72) Inventors: Somu Ramiah, Eden Prairie, MN (US); Pierre Olivier, Laval (CA); David Best, Elysian, MN (US); Lloyd Wendland, Newport Beach, CA (US); Christopher J. Ludewig, Northfield, MN (US); Andrew Morrow, Montreal (CA)

(73) Assignee: CalAmp Corp., Irvine, CA (US)

( * ) Notice: Subject to any disclaimer, the term of this patent is extended or adjusted under 35 U.S.C. 154(b) by 0 days.

(21) Appl. No.: 16/284,835

(22) Filed: Feb. 25, 2019

(65) Prior Publication Data

US 2019/0191368 A1    Jun. 20, 2019

Related U.S. Application Data

(63) Continuation of application No. 13/560,690, filed on Jul. 27, 2012, now Pat. No. 10,219,205.

(51) Int. Cl.
*H04M 1/00* (2006.01)
*H04W 48/18* (2009.01)
*H04W 64/00* (2009.01)

(52) U.S. Cl.
CPC ............ *H04W 48/18* (2013.01); *H04W 64/00* (2013.01)

(58) Field of Classification Search
CPC ....... H04W 88/06; H04W 88/10; H04W 8/18; H04W 36/0022; H04W 36/0055; H04W 36/0083; H04W 48/20; H04W 84/045; H04W 36/0069
See application file for complete search history.

(56) References Cited

U.S. PATENT DOCUMENTS

| 9,020,479 | B1 | 4/2015 | Gopalakrishnan |
| 10,219,205 | B2 | 2/2019 | Ramiah et al. |
| 2004/0176039 | A1 | 9/2004 | Leyh et al. |
| 2006/0199608 | A1 | 9/2006 | Dunn et al. |
| 2008/0194235 | A1 | 8/2008 | Dalsgaard et al. |
| 2009/0005061 | A1* | 1/2009 | Ward .................. G01S 5/021 455/456.1 |
| 2010/0067434 | A1 | 3/2010 | Siu et al. |
| 2010/0220687 | A1 | 9/2010 | Reznik et al. |
| 2010/0240370 | A1 | 9/2010 | Pandit et al. |
| 2011/0081931 | A1 | 4/2011 | Kuwada et al. |
| 2011/0207489 | A1 | 8/2011 | DeLuca |

(Continued)

*Primary Examiner* — Tu X Nguyen
(74) *Attorney, Agent, or Firm* — Barnes & Thornburg LLP

(57) ABSTRACT

Systems and methods for multiple network mode selection devices in accordance with embodiments of the invention are disclosed. In one embodiment of the invention, a multiple network mode selection device includes a processor, a radio module connected to the processor, and network determination process storage connected to the processor and configured to store one or more network determination processes, wherein the processor is configured to connect to a first network using the radio module, execute a network determination process selected from the one or more network determination process, reprogram the radio module in response to the executed network determination process, and connect to a second network using the radio module, where the second network is separate from the first network.

20 Claims, 11 Drawing Sheets

(56) References Cited

U.S. PATENT DOCUMENTS

| | | |
|---|---|---|
| 2011/0294539 A1 | 12/2011 | Shin et al. |
| 2012/0188876 A1* | 7/2012 | Chow .................. H04W 48/18 370/237 |
| 2012/0257550 A1 | 10/2012 | Chin et al. |
| 2014/0031075 A1 | 1/2014 | Ramiah et al. |

* cited by examiner

MULTIPLE NETWORK MODE SELECTION DEVICES

CROSS REFERENCE TO RELATED APPLICATIONS

The current application is a continuation of U.S. patent application Ser. No. 13/560,690, filed Jul. 27, 2012, entitled "Multiple Network Mode Selection Devices" to Ramiah et al., the disclosures of which are expressly incorporated by reference herein in their entirety.

FIELD OF THE INVENTION

The present invention relates to multiple network mode selection devices and more specifically to multiple network mode selection devices capable of automatically connecting to multiple networks.

BACKGROUND

Radio, the transmission of modulated electromagnetic waves, has been used as a method of communication since the late 19th century. Several different techniques are utilized to modulate radio signals including (but not limited to) modulation techniques that utilize variations in the amplitude, frequency, and/or phase of a radio frequency or RF signal to communicate analog or digital data.

Cellular data networks have been established which enable data to be transmitted and received using mobile devices equipped with an appropriately configured data radio. Several standards exist for cellular data, including General Packet Radio Service (GPRS), Enhanced Data rates for GSM (Global System of Mobile Communications) Evolution (EDGE), High-Speed Downlink Packed Access (HSDPA), Evolved High-speed Packet Access (HSPA+), Evolution-Data Optimized (EVDO), Worldwide Interoperability for Microwave Access (WiMAX), and 3GPP Long Term Evolution (LTE).

Qualcomm Gobi, from Qualcomm, Inc. of San Diego, Calif., is a mobile broadband chipset used to connect to cellular data networks, including GSM HSDPA/HSPA+ cellular data networks and Code Division Multiple Access (CDMA) EVDO rev.A cellular data networks. Gobi mobile broadband chipsets are capable of connecting to both CDMA and GSM cellular data networks using the same piece of silicon, reducing the amount of hardware necessary to support multiple cellular data networks.

SUMMARY OF THE INVENTION

Systems and methods for multiple network mode selection devices in accordance with embodiments of the invention are disclosed. In one embodiment of the invention, a multiple network mode selection device includes a processor, a radio module connected to the processor, and network determination process storage connected to the processor and configured to store one or more network determination processes, wherein the processor is configured to connect to a first network using the radio module, execute a network determination process selected from the one or more network determination process, reprogram the radio module in response to the executed network determination process, and connect to a second network using the radio module, where the second network is separate from the first network.

In another embodiment of the invention, the first network and the second network are selected from the group consisting of a code division multiple access network, a global system for mobile communications network, a worldwide interoperability for microwave access network, and a long term evolution network.

In an additional embodiment of the invention, a multiple network mode selection device further includes an input device connected to the processor, wherein the processor is configured to execute a network determination process selected from the one or more network determination processes utilizing the input device.

In yet another additional embodiment of the invention, the input device is configured to determine location information and the processor is configured to execute the network determination process utilizing the location information.

In still another additional embodiment of the invention, the input device is configured to determine velocity information and the processor is configured to execute the network determination process utilizing the velocity information.

In yet still another additional embodiment of the invention, the input device is configured to determine acceleration information and the processor is configured to execute the network determination process utilizing the acceleration information.

In yet another embodiment of the invention, the input device is configured to determine altitude information and the processor is configured to execute the network determination process utilizing the altitude information.

In still another embodiment of the invention, the input device is configured to determine time information and the processor is configured to execute the network determination process utilizing the time information.

In yet still another embodiment of the invention, the input device is capable of receiving input from a user and the processor is configured to execute the network determination process utilizes user input received using the received input.

In yet still another embodiment of the invention, the input device is capable of determining the service level of a network, wherein the service level of the network is selected from the group consisting of a quality of service measure, a cost of service measure, and a quantity of service measure, and wherein the processor is configured to execute the network determination process utilizing the service level information.

In yet another additional embodiment of the invention, the processor is configured to execute the network determination process using the availability of the first network and the availability of the second network.

In still another additional embodiment of the invention, at least one of the one or more network determination processes is pre-determined.

In yet still another additional embodiment of the invention, the processor is further configured to receive at least one network determination process in the one or more network determination processes using the first network.

In yet another embodiment of the invention, the processor is further configured to receive at least one network determination process in the one or more network determination processes using the second network.

In still another embodiment of the invention, a multiple network mode selection device further includes a management network interface configured to connect to a management network, wherein the processor is further configured to receive at least one network determination process in the one or more network determination processes using the management network.

Still another embodiments of the invention includes a method for connecting to a network, including connecting to a first network using a multiple network mode selection device, where the multiple network mode selection devices includes a radio module, executing a network determination process using the multiple network mode selection device, reprogramming the radio module in response to executing the network determination process using the multiple network mode selection device, and connecting to a second network using the multiple network mode selection device, where the second network is separate from the first network.

In yet another additional embodiment of the invention, the first network and the second network are selected from the group consisting of a code division multiple access network, a global system for mobile communications network, a worldwide interoperability for microwave access network, and a long term evolution network.

In still another additional embodiment of the invention, the multiple network mode selection device further includes an input device and executing a network determination process utilizes the input device and the multiple network mode selection device.

In yet still another additional embodiment of the invention, the input device is configured to determine location information.

In yet another embodiment of the invention, the input device is configured to determine velocity information.

In still another embodiment of the invention, the input device is configured to determine acceleration information.

In yet still another embodiment of the invention, the input device is configured to determine altitude information.

In yet another additional embodiment of the invention, the input device is configured to determine time information.

In still another additional embodiment of the invention, the input device is capable of receiving input from a user.

In yet still another embodiment of the invention, the input device is capable of determining the service level of the first network and the second network, wherein the service level of the first network and the second network is selected from the group consisting of a quality of service measure, a cost of service measure, and a quantity of service measure.

In yet still another additional embodiment of the invention, connecting to a network further includes determining the availability of the first network using the multiple network mode selection device, determining the availability of the second network using the multiple network mode selection device, wherein executing the network determination process using the multiple network mode selection device utilizes the availability of the first network and the availability of the second network.

In yet another embodiment of the invention, the network determination process are pre-determined.

In still another embodiment of the invention, connecting to a network further includes receiving the network determination process using the first network and the multiple network mode selection device.

In yet still another embodiment of the invention, connecting to a network further includes receiving the network determination process using the second network and the multiple network mode selection device.

In yet another additional embodiment of the invention, connecting to a network further includes receiving the network determination process using a management network and the multiple network mode selection device.

DETAILED DESCRIPTION

Figure 1:
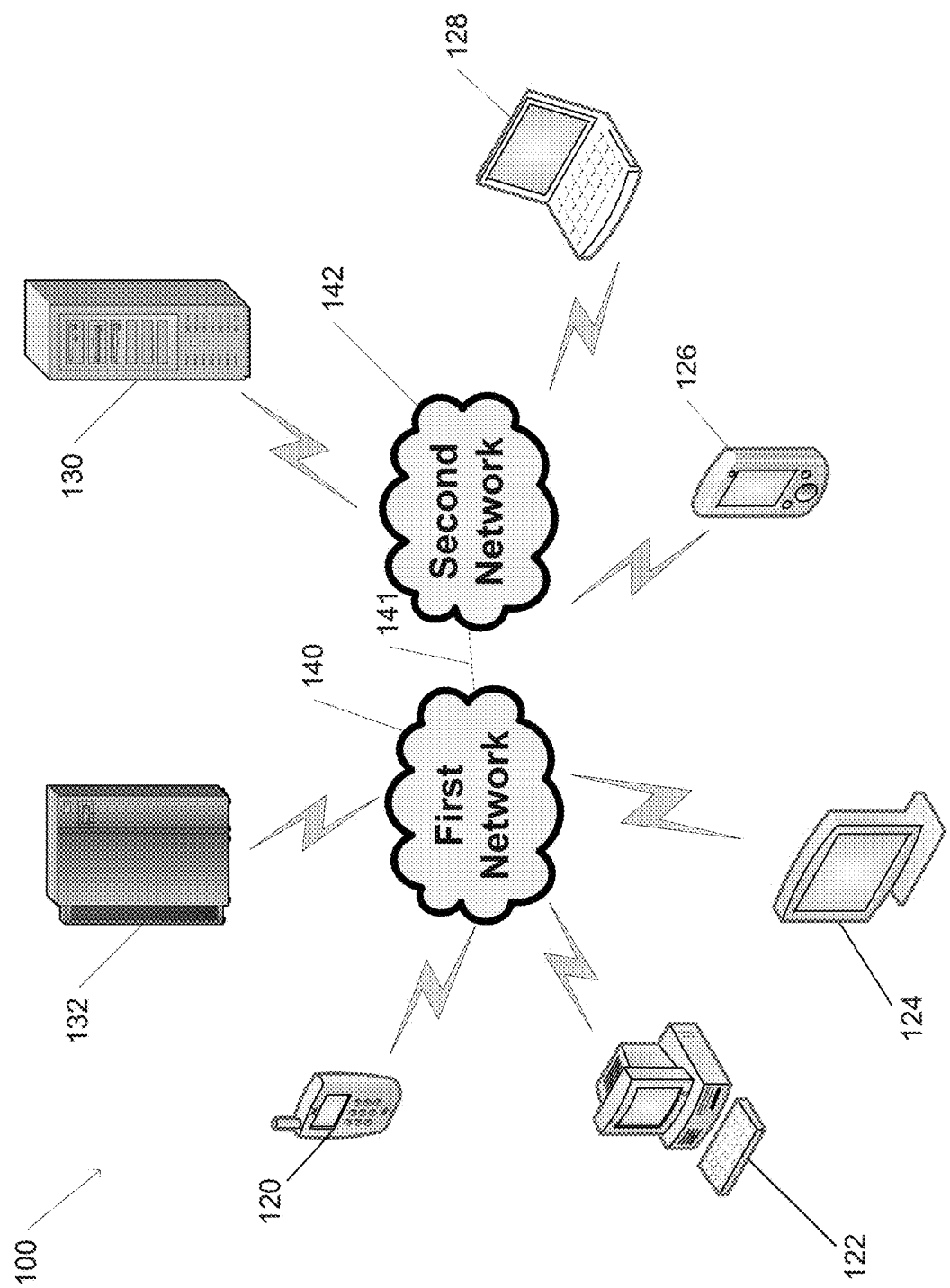
FIG. 1 is a system diagram of multiple network mode selection devices in accordance with an embodiment of the invention.

Turning now to the drawings, systems and methods for multiple network mode selection devices in accordance with embodiments of the invention are illustrated. Data radios are devices capable of communicating data over a radio connection. Many modern mobile devices, such as cellular telephones, contain data radios configured to connect to a network. These devices typically employ roaming lists in order to determine which bands, sub bands, and service providers are available (or are not available) on the network. In many embodiments, the roaming list is a priority list of bands, sub bands, and service providers, and the device will connect to the band, sub band, or service provider with the highest priority. In accordance with embodiments of the invention, if networks are available but not listed in the roaming list, the device will not connect to those networks.

Although these devices can be configured to communicate on different bands within a network, they are typically incapable of communicating on a network separate from the one the data radio contained in the device is configured to communicate on. In accordance with embodiments of the invention, a network is a communication medium for enabling the exchange of information between one or more devices communicating via the communication medium. A communication medium may take one of a variety of forms, including, but not limited to twisted pair wired networks, coaxial cable networks, microwave networks, satellite networks, cellular networks, radio networks, and infrared networks.

Some mobile devices employ a data radio capable of being configured to communicate on more than one network; however, these devices are typically provisioned at the time of manufacture to only use one particular network. The data radio allows the manufacturer to manufacture a single mobile device which may be sold by different network operators for use on incompatible networks, but the mobile device is configured to connect to a single, primary network operator. These devices may roam between network operators; however, these devices are not configured to dynamically connect to networks operated by different network operators in the same area.

Multiple network mode selection devices in accordance with embodiments of the invention include one or more radio modules and are capable of reprogramming the radio module(s) in order to connect to different networks. Multiple network mode selection devices include one or more network determination process which can be utilized to determine when and how to reprogram the radio module(s). In many embodiments, multiple network mode selection devices contain a variety of input devices, such as, but not limited to, GPS receivers, accelerometers, keyboards, and touchscreens. In accordance with embodiments of the invention, input devices are devices which provide sources of information which may be utilized by a multiple network mode selection device to determine when, and to which network, the multiple network mode selection devices should connect. For example, in accordance with embodiments of the invention, a multiple network mode selection device connected to a Code Division Multiple Access (CDMA) network is configured to connect, utilizing location information provided by a Global Positioning System (GPS) receiver in order to reprogram its radio module, to communicate on a Global System of Mobile Communications (GSM) network depending on the physical location of the multiple network mode selection device. In a number of embodiments, input devices receive input from a user.

Systems and methods for multiple network mode selection devices and network determination processes in accordance with embodiments of the invention are discussed herein.

System Overview

Multiple network mode selection devices communicate with a variety of devices across one or more networks. A plurality of multiple network mode selection devices capable of communicating via a plurality of networks in accordance with an embodiment of the invention is illustrated in FIG. 1. The plurality of multiple network mode selection devices capable of communicating via a plurality of networks 100 includes one or more multiple network mode selection devices, such as, but not limited to, cellular devices 120, personal computers 122, remote terminals 124, tablet devices 126, tracking devices 128, servers 130, and data centers 132. In many embodiments, the plurality of networks a multiple network mode selection device is capable of communicating via include a first network 140 and a second network 142. In many embodiments, multiple network mode selection devices are capable of communication with non-multiple network mode selection devices.

In a number of embodiments, a multiple network mode selection device is only capable of communicating via one network at a time. In several embodiments, the multiple network mode selection devices are capable of selecting which of the first network 140 and the second network 142 to communicate on based on a variety of factors using one or more network determination processes. In many embodiments, the first network 140 is a CDMA cellular data network and the second network 142 is a GSM cellular data network. In a number of embodiments, both the first network and the second network are GSM or CDMA cellular data networks operated by different carriers. The first and second networks may also be, but are not limited to, Worldwide Interoperability for Microwave Access (WiMAX) and/or 3GPP Long Term Evolution (LTE) networks. In several embodiments, the first network and the second network are connected by a backhaul network 141, such as the Internet. In many embodiments, multiple network mode selection devices are configured to communicate with devices connected to the backhaul network 141.

Although a plurality of multiple network mode selection devices capable of communicating via a plurality of networks in accordance with an embodiment of the invention is shown in FIG. 1, other implementations appropriate to a specific application can be utilized in accordance with embodiments of the invention, including multiple network mode selection devices not specifically disclosed herein, multiple network mode selection devices capable of communicating via more than two networks, and multiple network mode selection devices capable of communicating via non-cellular data networks. Systems and methods for multiple network mode selection devices in accordance with embodiments of the invention are discussed further herein.

Multiple Network Mode Selection Devices

Figure 2:
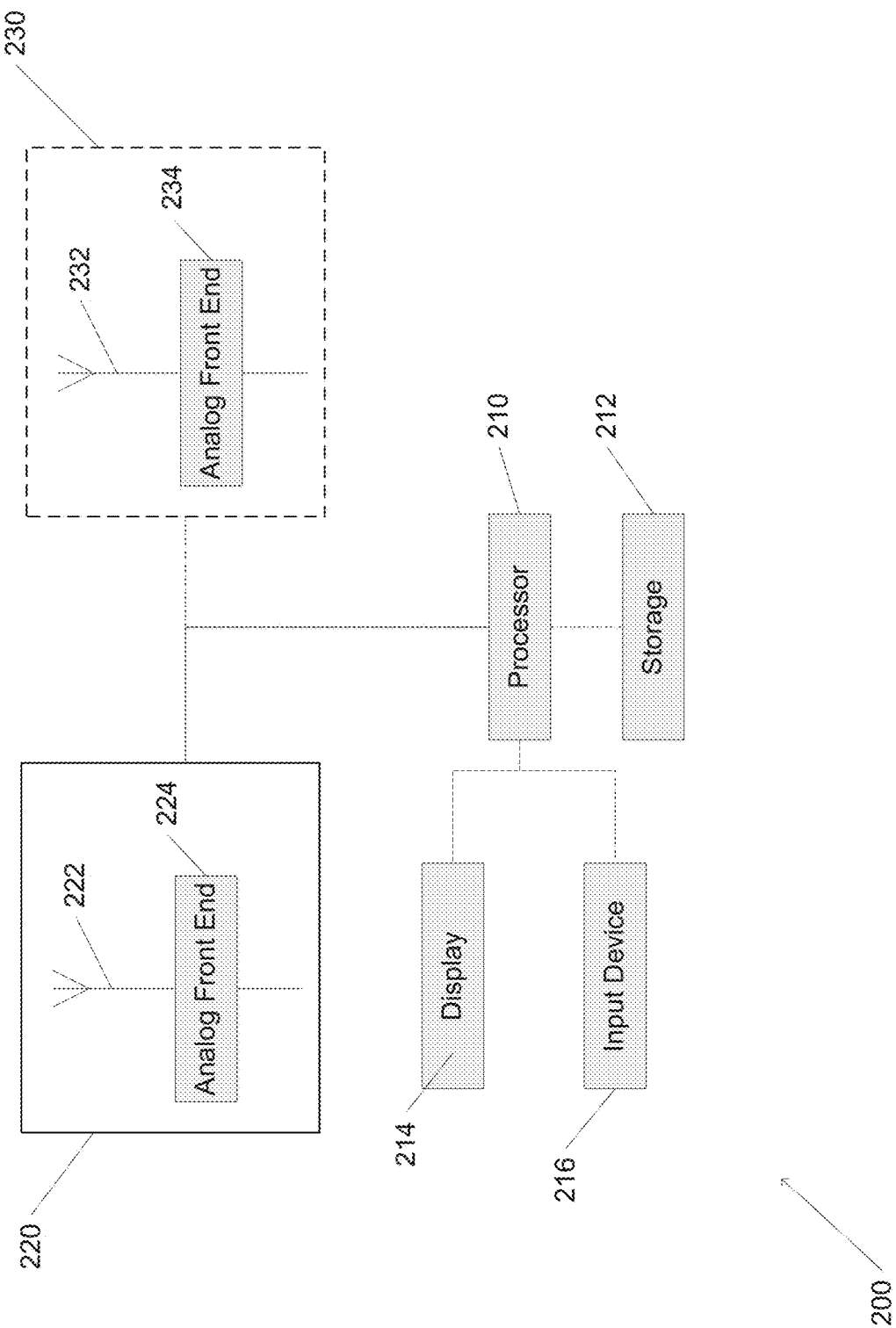
FIG. 2 is a block diagram of a multiple network mode selection device in accordance with an embodiment of the invention.

A variety of architectures may be utilized in order to implement a multiple network mode selection device. A multiple network mode selection device in accordance with an embodiment of the invention is illustrated in FIG. 2. A multiple network mode selection device contains a processor 210 in communication with a storage device 212. In several embodiments, a multiple network mode selection device is capable of storing information related to connecting to networks, including network determination processes, using the storage 212. In many embodiments, the processor 210 is in communication with a display 214 and/or an input device 216. In several embodiments, the multiple network mode selection device is capable of displaying network information using the display 214. In a number of embodiments, the multiple network mode selection device is capable of automatically connecting to networks using data obtained via the input device 216. In many embodiments, the multiple network mode selection device is capable of receiving commands to connect to networks using the input device 216.

The processor 210 is connected to a radio module 220. In a number of embodiments, the radio module 220 includes an antenna 222 and an analog front end 224 capable of communicating via a variety of networks. In many embodiments of the invention, the antenna 222 is tuned to transmit and receive cellular radio signals. In a number of embodiments, the antenna 222 is tuned to transmit and receive multiple radio signals. In many embodiments, the analog front end 224 is configured to communicate via a first network and can be reprogrammed in order to communicate via a second network. In a number of embodiments, the analog front end 224 is implemented utilizing the processor 210 to perform analog to digital conversions. In several embodiments, the processor 210 is capable of communicating via one or more networks simultaneously using the radio module 220. In a number of embodiments, the radio module 220 is a programmable radio module capable of being reprogrammed to communicate on a variety of networks. In several embodiments, the radio module 220 is implemented using a mobile broadband chipset such as the Qualcomm Gobi chipset manufactured by Qualcomm, Inc. of San Diego, Calif.

In accordance with embodiments of the invention, a multiple network mode selection device contains a second radio module 230 containing an antenna 232 and an analog front end 234 capable of communicating via a variety of networks. Multiple network mode selection devices containing both a radio module 220 and a second radio module 230 can communicate via multiple networks simultaneously. In other embodiments, a multiple network mode selection device may contain three or more radio modules.

Although a specific architecture of a multiple network mode selection device is shown in FIG. 2, other implementations appropriate to a specific application can be utilized in accordance with embodiments of the invention. Methods of operation of multiple network mode selection devices in accordance with embodiments of the invention are discussed further herein.

Figure 3:
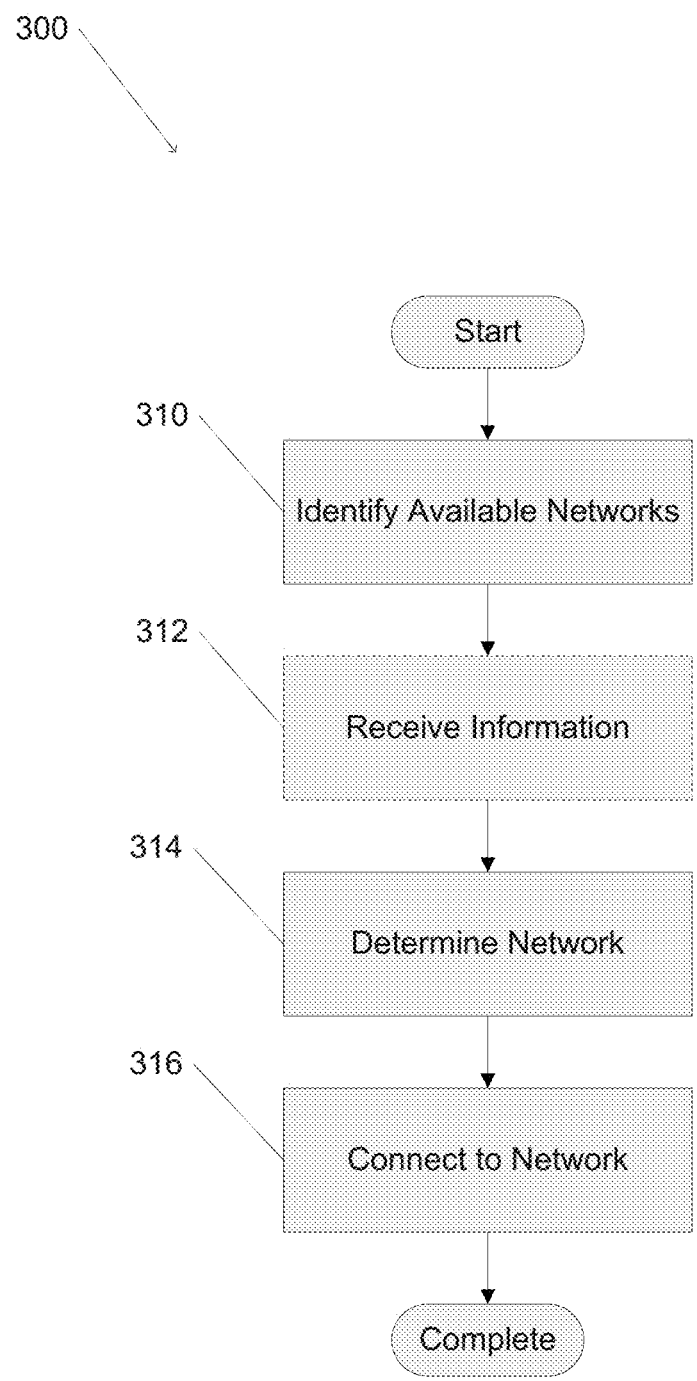
FIG. 3 is a flow chart illustrating a process for determining a network to which a multiple network mode selection device will connect in accordance with an embodiment of the invention.

Network Determination Processes Using Multiple Network Mode Selection Devices Multiple network mode selection devices are configured to connect to networks based on a variety of conditions, such as the location of the multiple network mode selection device and/or network availability, using network determination processes. A process for determining and executing a network determination process and connecting to a network using a multiple network mode selection device in accordance with an embodiment of the invention is illustrated in FIG. 3. The process 300 includes identifying (310) available networks. In a number of embodiments, a multiple network mode selection device will not attempt to connect to a network that is not available. In several embodiments, the multiple network mode selection device receives (312) information to be used in determining if, and to what, network the multiple network mode selection device should connect. In many embodiments, the information received (312) includes information related to the location and environment surrounding the multiple network mode selection device. The multiple network mode selection device determines (314) to which network the multiple network mode selection device should connect. The multiple network mode selection devices connects (316) to the determined (314) network.

A number of processes which may be utilized by multiple network mode selection devices in order to determine a network to connect to a network in accordance with embodiments of the invention are discussed herein. Network mode selection devices in accordance with embodiments of the invention are configured to perform one or more of the network determination processes described herein. In a number of embodiments, a network mode selection device is capable of dynamically switching between one or more of the network determination processes. In several embodiments, the network mode selection device selects a network determination process automatically. In many embodiments, the multiple network mode selection device switches between network determination processes based upon received input. The received input may be, but is not limited to, sensor data received from input devices such as GPS receivers, management information received from a network, or user input received from an input device configured to receive user input.

Figure 4:
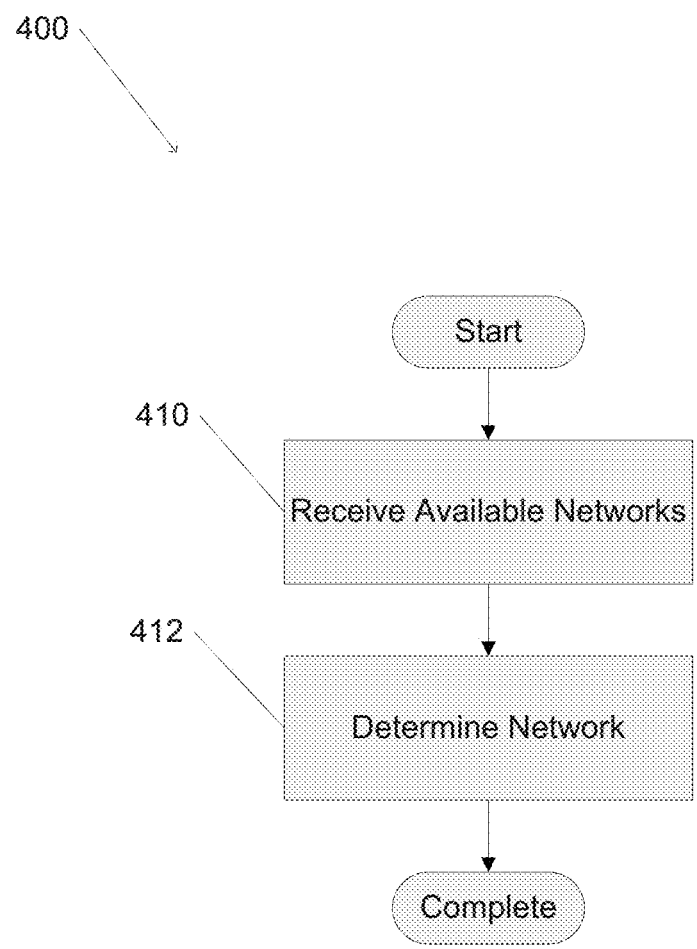
FIG. 4 is a flow chart illustrating a network determination process utilizing the availability of one or more networks which may be utilized by multiple network mode selection devices in accordance with an embodiment of the invention.

A first network determination process for determining a network to connect to in accordance with an embodiment of the invention is illustrated in FIG. 4. The process 400 includes receiving (410) information regarding available networks and determining (412) a network to connect to using the received (410) network availability. For example, when moving between an area having a first network and a second network available (410) to an area with just the second network available (410), a multiple network mode selection device communicating via the first network will select (412) the second network when the first network becomes unavailable.

Figure 5:
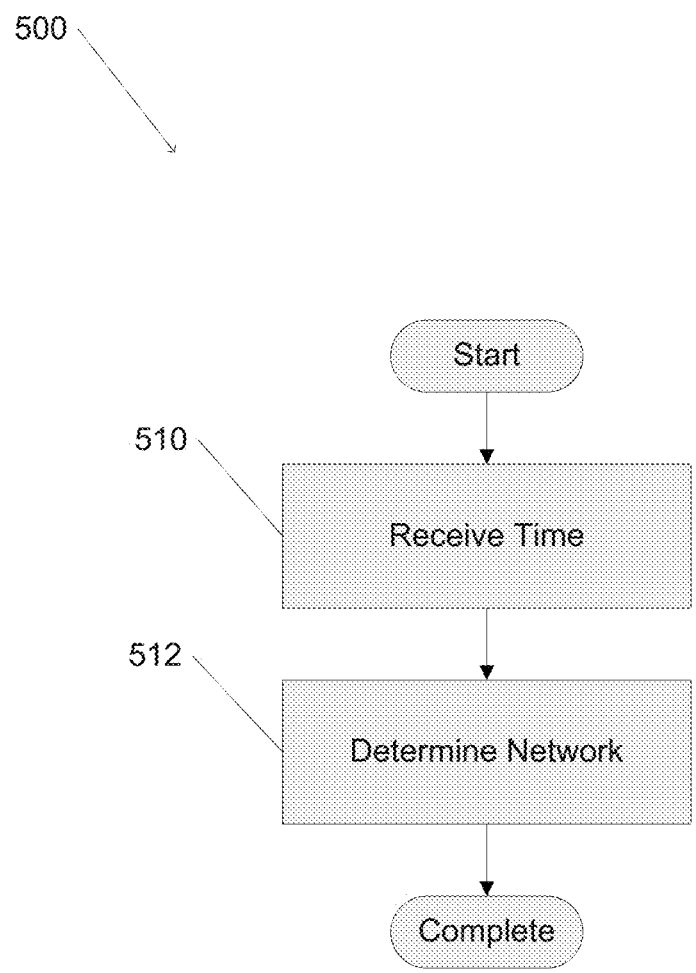
FIG. 5 is a flow chart illustrating a network determination process utilizing the time and/or schedule which may be utilized by multiple network mode selection devices in accordance with an embodiment of the invention.

A second network determination process utilized in multiple network mode selection devices to connect to a network based on a time or schedule in accordance with an embodiment of the invention is illustrated in FIG. 5. The process 500 includes receiving (510) the time. A network is determined (512) using the received (510) time. In a number of embodiments, the time is received (510) using a clock and/or a scheduling device. In many embodiments, the time or schedule is pre-determined. In several embodiments, the time or schedule is dynamically configured.

Figure 6:
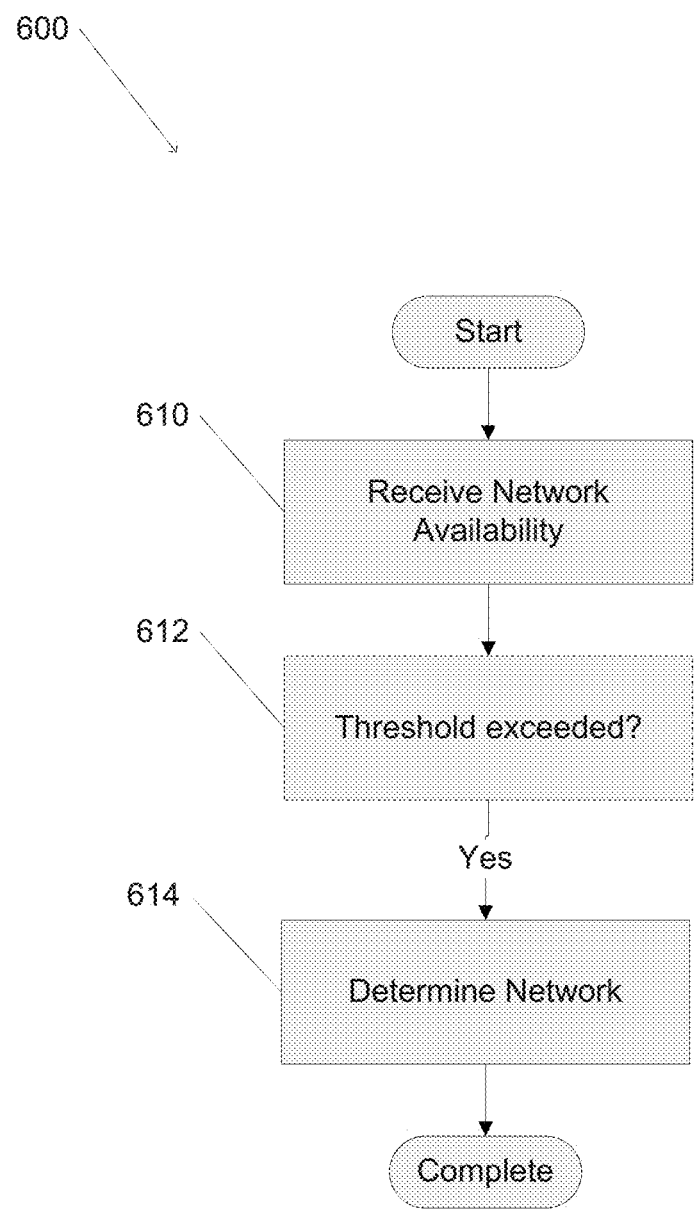
FIG. 6 is a flow chart illustrating a network determination process utilizing the unavailability of one or more networks which may be utilized by multiple network mode selection devices in accordance with an embodiment of the invention.

A third network determination process utilized by multiple network mode selection devices to determine a network based on the unavailability of one or more of the networks in accordance with an embodiment of the invention is illustrated in FIG. 6. The process 600 includes receiving (610) the availability of one or more networks and a network is determined (614) based on the received (610) availability of the one or more networks. In many cases, a timeout threshold is exceeded (612) before a new network is determined (614). For example, in an area with both a first network and a second available, a multiple network mode selection device connected to the first network will determine (614) that the multiple network mode selection device will connect to the second network once the amount of time the first network has been unavailable (610) exceeds (612) a timeout threshold. In several embodiments, the timeout threshold is pre-determined. In a number of embodiments, the timeout threshold is dynamically determined.

Figure 7:
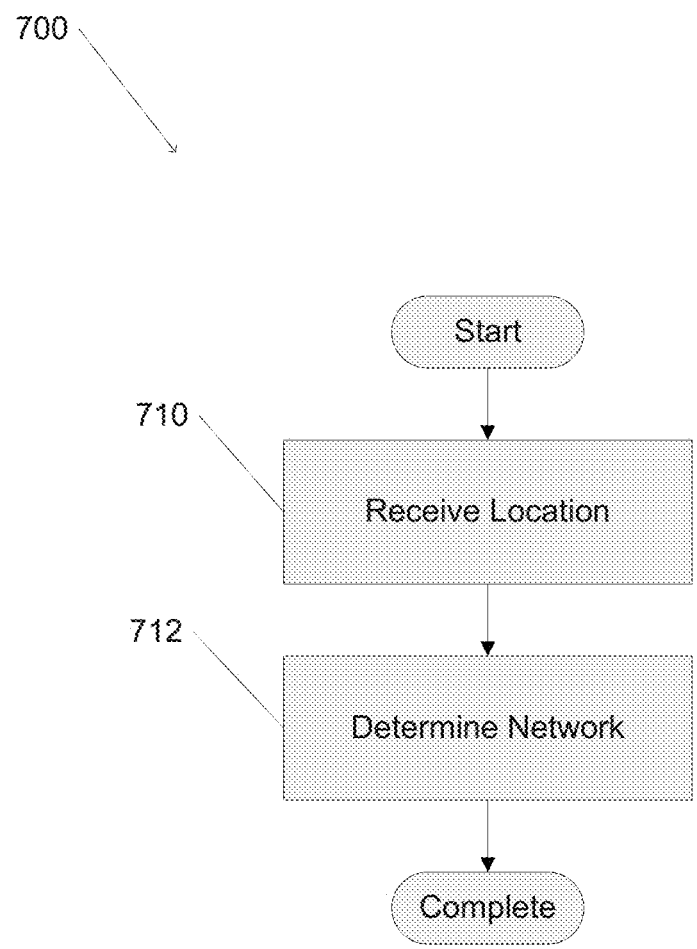
FIG. 7 is a flow chart illustrating a network determination process utilizing the location of a multiple network mode selection device in accordance with an embodiment of the invention.

A fourth network determination process utilized by a multiple network mode selection device to determine a network to connect to utilizing the location of the multiple network mode selection device in accordance with an embodiment of the invention is illustrated in FIG. 7. The process 700 involves receiving (710) the location of the multiple network mode selection device and determining (712) a network the multiple network mode selection device should connect to using the received (710) location. In many embodiments, the location of a multiple network mode selection device is received (710) using a global positioning system (GPS) device. In a number of embodiments, the location of a multiple network device is received (710) utilizing information obtained via a network. In many embodiments, the network is a cellular data network. In several embodiments, the network is a non-cellular network, such as an 802.11 network, a Bluetooth network, or a Zigbee network.

Figure 8:
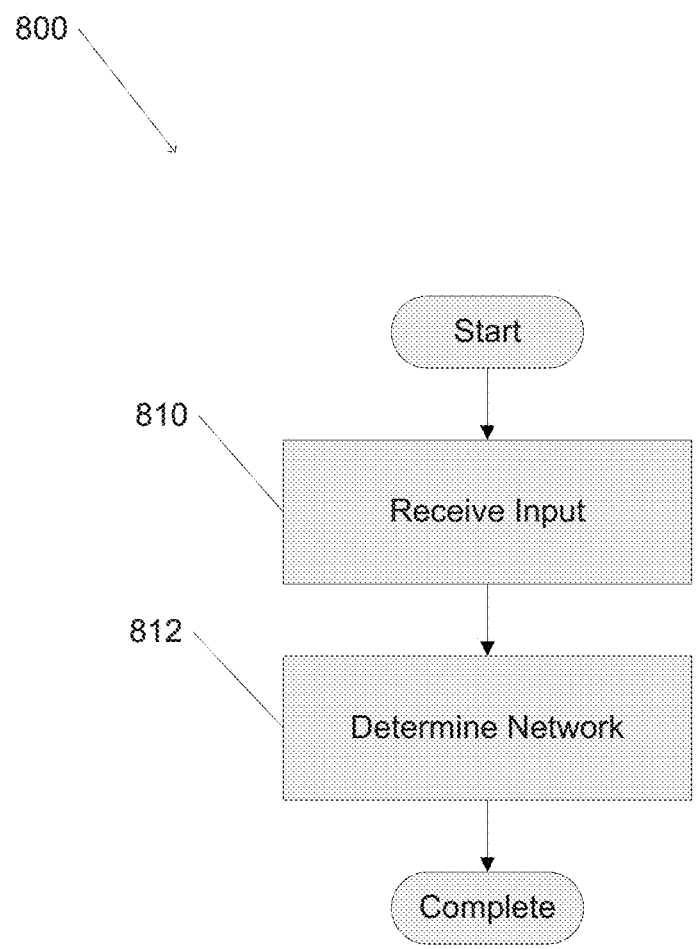
FIG. 8 is a flow chart illustrating a network determination process utilizing input data received using an input device which may be utilized by multiple network mode selection devices in accordance with an embodiment of the invention.

A fifth network determination process utilized by multiple network mode selection devices to determine a network to connect to involving receiving input from an input device in accordance with an embodiment of the invention is illustrated in FIG. 8. The process 800 includes receiving (810) input from an input device and determining (812) which network the multiple network mode selection should connect to using the received (810) input. In several embodiments, the multiple network mode selection device calculates its location using data received (810) via one or more input devices. In many embodiments, input devices may be sensors, such as accelerometers, altimeters, and input devices capable of determining the velocity of a multiple network mode selection device. In a number of embodiments, input devices are devices capable of receiving (810) user input, such as a keyboard, mouse, or speech recognition devices. In a number of embodiments, the data is received (810) using a network device connected to a network, such as the Internet or a management network, where the management network is a network other than the first network or the second network. In accordance with embodiments, management networks include, but are not limited to, 802.11 networks, Bluetooth networks, and/or Zigbee networks. Other input devices and management networks not specifically listed herein may be utilized in accordance with embodiments of the invention.

Figure 9:
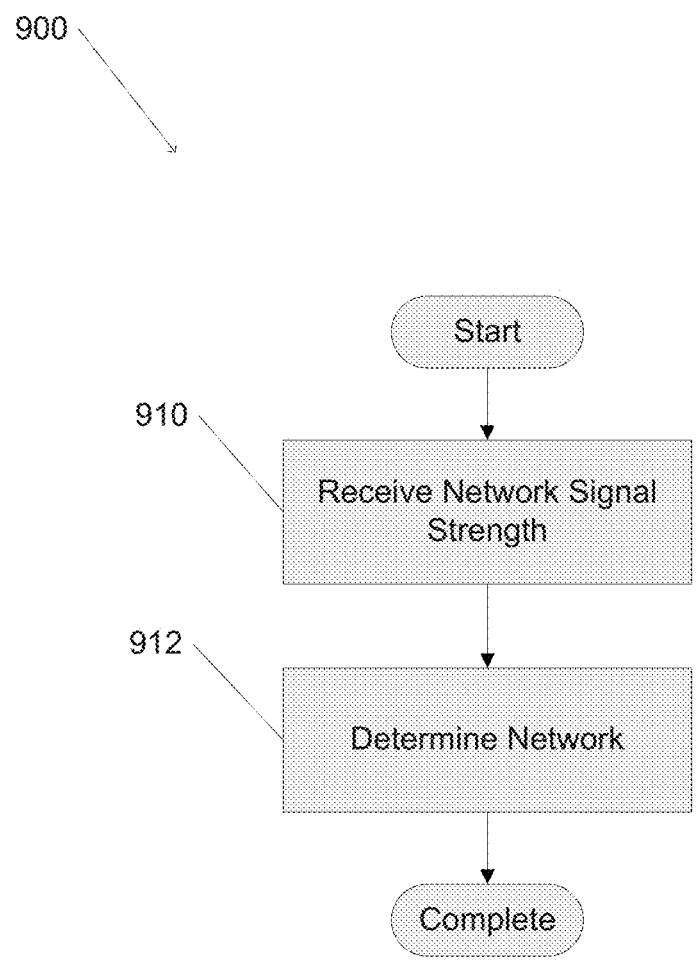
FIG. 9 is a flow chart illustrating a network determination process utilizing the signal strength of one or more networks which may be utilized by multiple network mode selection devices in accordance with an embodiment of the invention.

A sixth network determination process utilized by multiple network mode selection devices to determine a network to connect to involving connecting to a network based on the signal strength of the first and second networks in accordance with an embodiment of the invention is illustrated in FIG. 9. The process 900 includes receiving (910) the signal strength of available networks and determining (912) which network to connect to using the received (910) signal strengths. In accordance with embodiments of the invention, a multiple network mode selection device receives (910) the signal strength of a network. In several embodiments, the signal strength of a network is received (910) using a Received Signal Strength Indicator (RSSI). In several embodiments, a multiple network mode selection devices uses the RSSI for the first network and the second network, determines which network has the strongest signal, and connects to the network with the strongest signal.

Figure 10:
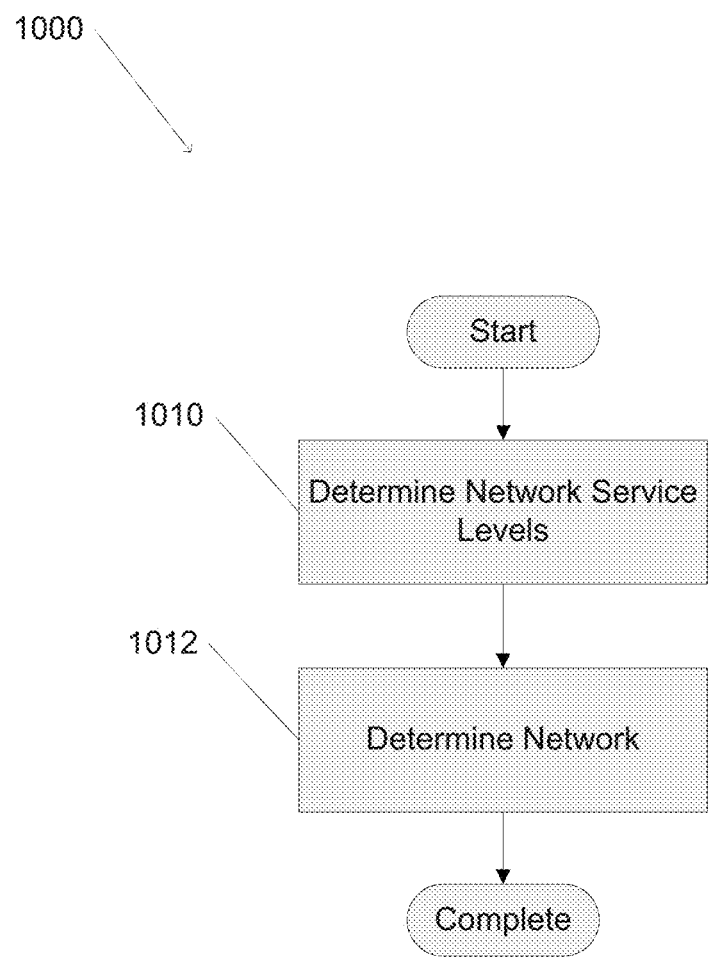
FIG. 10 is a flow chart illustrating a network determination process utilizing the service level of one or more networks which may be utilized by multiple network mode selection devices in accordance with an embodiment of the invention.

A seventh network determination process utilized by multiple network mode selection devices to determine a network to connect to involving connecting to a network based on the service level of the network in accordance with an embodiment of the invention is illustrated in FIG. 10. The process 1000 includes determining (1010) the service level for available networks and determining (1012) which network to connect to using the determined (1010) service level. In many embodiments, the determined (1010) service level for a network is a quality of service (QoS) measurement for the network. In several embodiments, the determined (1010) service level for a network is related to the cost of communicating on the network. In a number of embodiments, the determined (1010) service level for a network is related to the amount of data which may be communicated using the network.

A number of processes for determining a network to which a multiple network mode selection device should connect have been described with respect to FIGS. 3-10; however, a variety of processes not specifically described above may be utilized in accordance with embodiments of the invention. Processes for connecting to a network using a multiple network mode selection device in accordance with embodiments of the invention are discussed herein.

Connecting to Networks Using a Multiple Network Mode Selection Device

Figure 11:
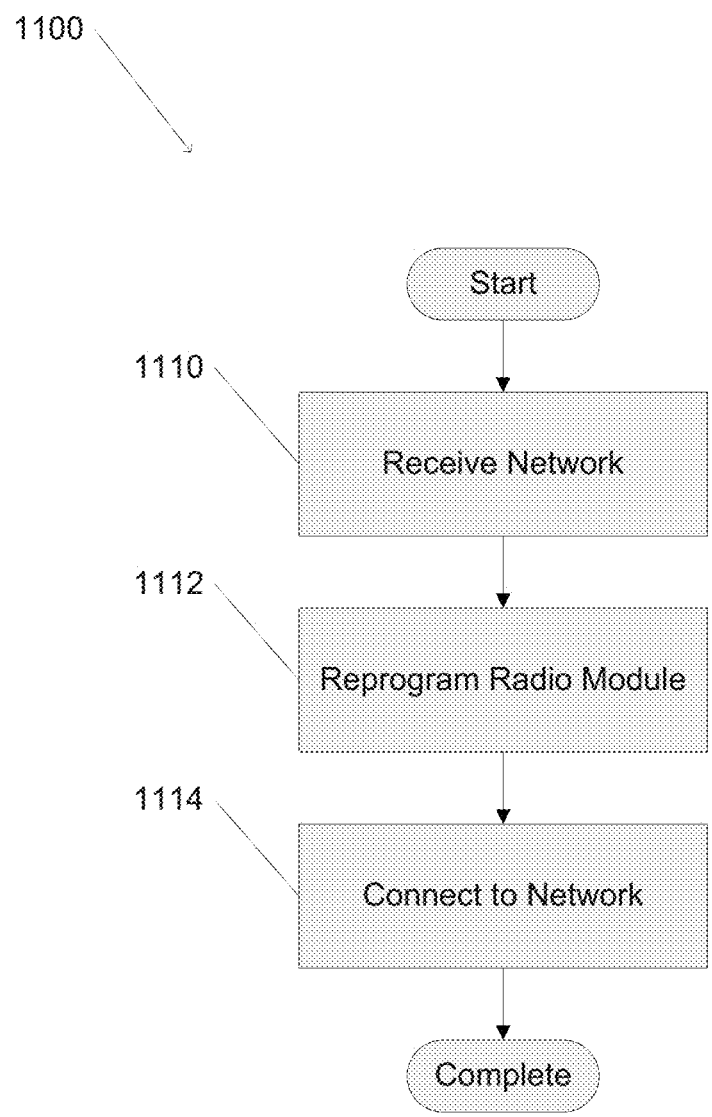
FIG. 11 is a flow chart illustrating a process for connecting to a network using a multiple network mode selection device in accordance with an embodiment of the invention.

In order to communicate using multiple networks, a multiple network mode selection device performs one or more network determination processes in order to determine which network the multiple network mode selection device should connect. A process for executing a network determination process using a multiple network mode selection device in accordance with an embodiment of the invention is illustrated in FIG. 11. The process 1100 includes receiving (1110) the identity of a network to which a multiple network mode selection device should connect. The multiple network mode selection device reprograms (1112) its radio module using the received (1110) network. The multiple network mode selection devices connect (1114) to the network.

In many embodiments, the received (1110) network is determined using the process described with respect to FIGS. 3-10. In several embodiments, a multiple network mode selection device reprograms (1112) its radio module to connect (1114) to a received (1110) first network. In a number of embodiments, a multiple network mode selection device is connected to a first network and reprograms (1112) its radio module in order to connect (1114) to a received (1110) second network.

A specific process for connecting to a network using a multiple network mode selection device is described herein; however, a variety of processes may be utilized to connect to a network, including those which do not reprogram a radio module, using a multiple network mode selection device in accordance with embodiments of the invention.

Although the embodiments have been described in certain specific aspects, many additional modifications and variations would be apparent to those skilled in the art. It is therefore to be understood that the embodiments may be practiced otherwise than specifically described without departing from the scope and spirit of the invention. Thus, the embodiments should be considered in all respects as illustrative and not restrictive. Accordingly, the scope of the invention should be determined not by the embodiments illustrated, but by the appended claims and their equivalents.

What is claimed is:

1. A multiple network mode selection device, comprising:
a processor;
a first radio module and a second radio module, both coupled to the processor and programmed to perform communication with a first radio network and a second radio network, where communication with the first and second radio networks are incompatible, and wherein the first radio network and the second radio network are selected from the group consisting of a code division multiple access network (CDMA), a global system for mobile communications network (GSM), a high-speed downlink packet access network (HSDPA), an evolved high-speed packet access network (HSPA), a worldwide interoperability for microwave access network (WiMAX), and a long term evolution network (LTE); and
an input device coupled to the processor;
a storage device coupled to the processor and storing one or more network determination processes;
wherein the processor is directed to perform:
connecting the first radio module and the second radio module to the first radio network;
executing a network determination process selected from the one or more network determination processes in response to connecting the first radio module and the second radio module to the first radio network;
in response to executing the network determination process, reprogramming the first radio module to perform communication with the second radio network, wherein the second radio network is incompatible with the first radio network such that a radio module that has been configured to communicate on the first network is incapable of communicating on the second network unless the radio module is reprogrammed; and connecting the first radio module to the second radio network for at least some time while the second radio module remains connected to the first radio network in response to reprogramming the first radio module.

2. The multiple network mode selection device of claim 1, wherein:
the input device is configured to determine location information; and
the network determination process comprises determining which network to connect to based on the location information.

3. The multiple network mode selection device of claim 1, wherein:
the input device is configured to determine acceleration information; and
the network determination process comprises determining which network to connect to based on the acceleration information.

4. The multiple network mode selection device of claim 1, wherein:
the input device is configured to determine altitude information; and
the network determination process comprises determining which network to connect to based on the altitude information.

5. The multiple network mode selection device of claim 1, wherein:
the input device is configured to determine time information; and
the network determination process comprises determining which network to connect to based on the time information.

6. The multiple network mode selection device of claim 1, wherein:
the input device is capable of receiving input from a user; and
the network determination process comprises determining which network to connect to based on the input from the user.

7. The multiple network mode selection device of claim 1, wherein:
the input device is capable of determining a service level of a network;
the service level of the network is selected from the group consisting of a quality of service measure, a cost of service measure, and a quantity of service measure; and
the network determination process comprises determining which network to connect to based on the service level of the network.

8. The multiple network mode selection device of claim 1, wherein the processor is further directed to identify the network determination process by using an availability of the first radio network and an availability of the second radio network.

9. The multiple network mode selection device of claim 1, wherein at least one of the one or more network determination processes is pre-determined.

10. The multiple network mode selection device of claim 1, wherein the processor is further directed to receive at least one network determination process in the one or more network determination processes by using the first radio network.

11. The multiple network mode selection device of claim 1, wherein the processor is further directed to receive at least one network determination process in the one or more network determination processes by using the second radio network.

12. The multiple network mode selection device of claim 1, further comprising:
a management network interface configured to connect to a management network;
wherein the processor is further directed to receive at least one network determination process in the one or more network determination processes by using the management network.

13. A method of selecting radio networks for a multiple network mode selection device, comprising:
connecting a first radio module and a second radio module to a first radio network, wherein the first radio module and the second radio module are programmed to perform communication with the first radio network and a second radio network, where communication with the first and second radio networks are incompatible, and wherein the first radio network and the second radio network are selected from the group consisting of a code division multiple access network (CDMA), a global system for mobile communications network (GSM), a high-speed downlink packet access network (HSDPA), an evolved high-speed packet access network (HSPA), a worldwide interoperability for microwave access network (WiMAX), and a long term evolution network (LTE);
executing a network determination process selected from one or more network determination processes in response to connecting the first radio module and the second radio module to the first radio network;
in response to executing the network determination process, reprogramming the first radio module to perform communication with the second radio network, wherein the second radio network is incompatible with the first radio network such that a radio module that has been configured to communicate on the first network is incapable of communicating on the second network unless the radio module is reprogrammed; and
connecting the first radio module to the second radio network for at least some time while the second radio module remains connected to the first radio network in response to reprogramming the first radio module.

14. The method of claim 13, further comprising: identifying the network determination process by using an availability of the first radio network and an availability of the second radio network.

15. The method of claim 13, further comprising:
receiving input from a user; and
determining which network to connect to based on the input from the user.

16. The method of claim 13, further comprising:
determining a service level of a network; wherein the service level of the network is selected from the group consisting of a quality of service measure, a cost of service measure, and a quantity of service measure; and
determining which network to connect to based on the service level of the network.

17. The method of claim 13, further comprising identifying the network determination process by using an availability of the first radio network and an availability of the second radio network.

18. The method of claim 13, wherein at least one of the one or more network determination processes is pre-determined.

19. The method of claim 13, further comprising receiving at least one network determination process in the one or more network determination processes by using the first radio network.

20. The method of claim 13, further comprising receiving at least one network determination process in the one or more network determination processes by using the second radio network.

* * * * *